May 16, 1939. B. A. WESCHE 2,158,556
POWER GRINDER
Filed Nov. 27, 1935
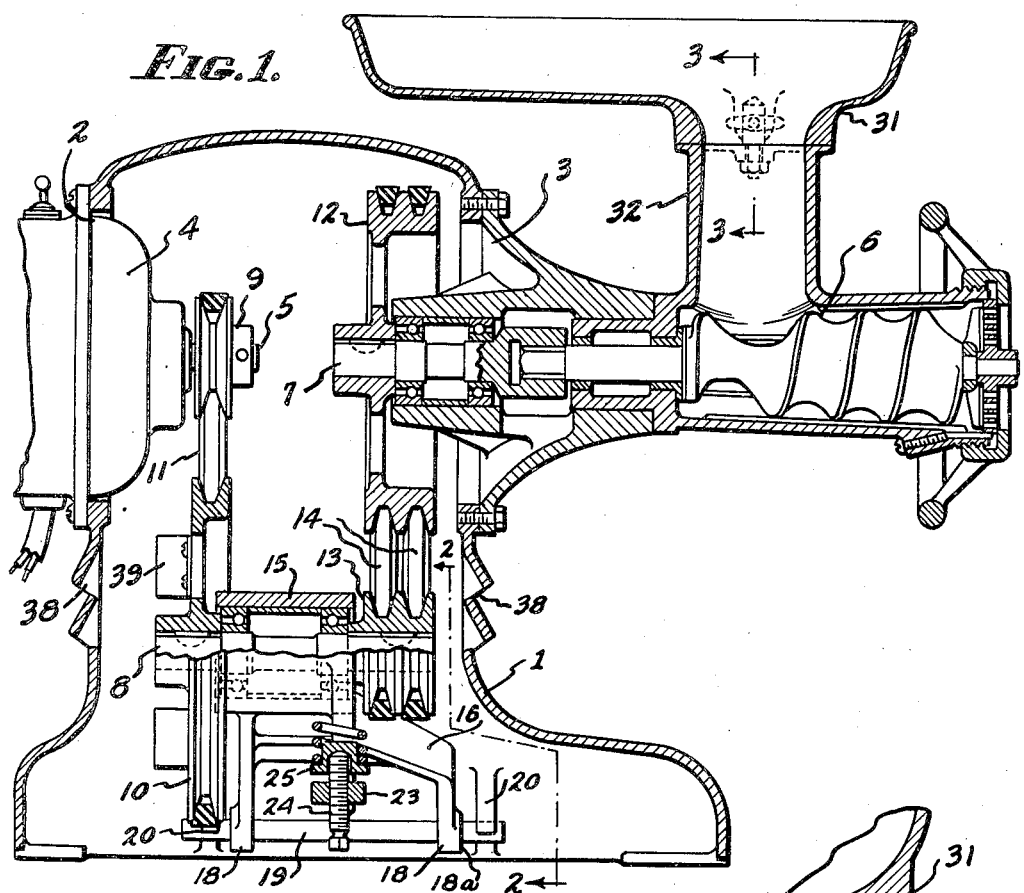
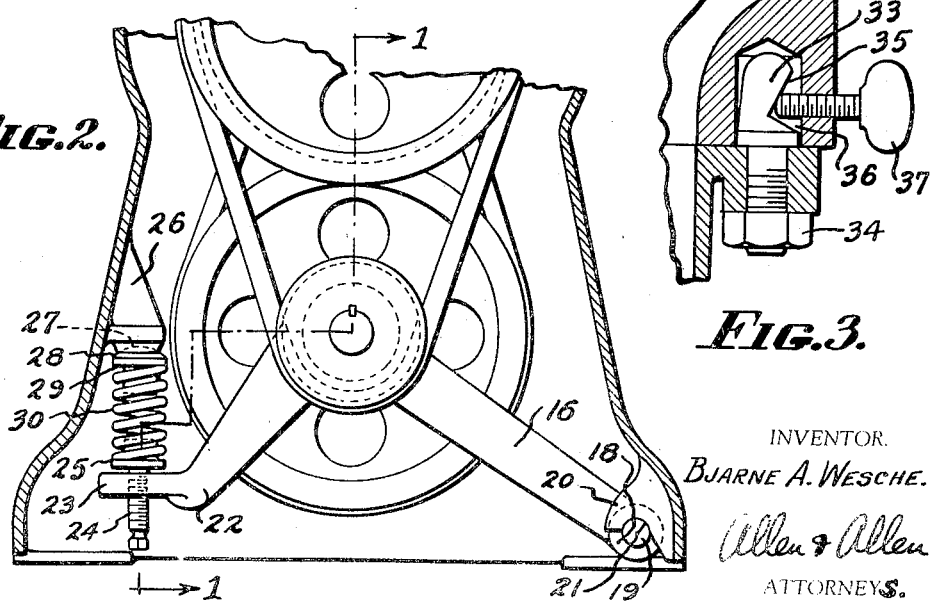
INVENTOR.
BJARNE A. WESCHE.
Allen & Allen
ATTORNEYS.

Patented May 16, 1939

2,158,556

UNITED STATES PATENT OFFICE 2,158,556

POWER GRINDER

Bjarne A. Wesche, Cincinnati, Ohio, assignor to The Cincinnati Time Recorder Company, Cincinnati, Ohio, a corporation of Ohio Application November 27, 1935, Serial No. 51,856

5 Claims. (Cl. 146—182)

My invention relates to power grinders for use in grinding meat or analogous material and in which the power or motor unit and the grinder itself are contained in a single unit or housing in order to give a compact machine with the minimum of projections or configurations in order to prevent the collection of dirt or dust.

It is an object of my invention to provide a power grinder which is compact in size and in which the gripping of the belts is insured.

A further object of my invention is to provide a power grinder in which the ratio of the motor speed to the grinder speed is greatly reduced and the torque thereby greatly increased without the use of a plurality of gears with their constant hum and their difficult lubricating problems.

It is an object of my invention to provide a grinder in which the speed reduction and power increase is accomplished by the use of belts and pulleys but in which the belt tension is kept constant, thus insuring the maximum amount of grippage at all times.

Another object of my invention is to provide a grinder with all the above features which may be readily cleaned and adjusted and which is extremely simple to construct and to keep in operative condition.

These and other objects of my invention which will be set forth hereinafter or will be apparent to one skilled in the art upon reading these specifications, I accomplish by that certain construction and arrangement of parts of which I shall now describe a preferred embodiment. Reference is now made to the drawing which forms a part hereof and in which:

Figure 1 is a vertical section of my novel power grinder.

Figure 2 is a section taken on the section lines 2—2 of Figure 1, showing my novel floating shaft.

Figure 3 is a section taken on the section line 3—3 of Figure 1 and showing my novel lug for attaching the feed pan on the grinder.

Briefly, my invention comprises the placing of the motor unit in line with the grinder unit in a single housing, so that the motor shaft and the grinder shaft will be in line, and floating an offset shaft in the base of the housing resiliently urged away from the motor and grinder shafts with belts and pulleys operatively connecting all the shafts in such a manner that the floating shaft will maintain a constant tension of all the belts in the device.

Referring to the drawing I provide a housing 1, having two apertures 2 and 3 in the main portion thereof and in alignment with each other. An electric motor 4 having a shaft 5 is mounted by any means well known in the art within the aperture 2, so that the shaft 5 projects within the housing 1. The ordinary type of grinder well known in the art and generally indicated by the numeral 6 is positioned within the aperture 3 so that the drive shaft 7 will project within the housing 1 and in alignment with the motor shaft 5.

Within the base of the housing 1, I mount the floating shaft 8 in a manner which will be described. A pulley 9 is keyed to the motor shaft, while a pulley 10 is keyed to the floating shaft 8 in such a manner that the pulleys 9 and 10 are within alignment of each other, and may be joined by the belt 11. I preferably make the pulley 10 of greater diameter than the pulley 9 in order to reduce the speed of the shaft 8 in relation to the speed of the motor shaft 5. Pulleys 12 and 13 are mounted on the grinder shaft and the floating shaft 8, respectively, in alignment with each other and joined by the belts 14. In my preferred embodiment I have shown the use of double pulleys with the pulley 12 of greater diameter in order to reduce the speed and thus increase the power of the grinder shaft 7 in relation to the floating shaft 8.

The floating shaft 8 is journaled in the bearing or arbor 15 which in turn has two legs 16 projecting therefrom and terminating in bosses 18. The apertures 18a of the bosses 18 are in alignment and a rod 19 is positioned and held within these apertures. There are two projections or bosses 20 cast into the base of the housing 1 and having indentations 21 on their lower side. These indentations accommodate the rod 19 and thus prevent the legs 16 of the arbor 15 from being moved in an upward direction. There is a third leg 22 projecting from the arbor 15 in an opposite direction from the leg 16 and terminating in a threaded lug 23. A screw 24 is threaded in this lug and terminated in a spring base 25. A projection or lug 26 is cast in the base of the housing 1 as indicated in Figure 2, and has a cup 27 positioned on the bottom portion thereof. A registering convex portion 28 of a spring base 29 is positioned within the cup 27. A spring 30 is held in position between the two spring bases 25 and 29. It is apparent in this construction that the spring 30 urges the arbor carrying the shaft 8 with the pulleys 10 and 13 away from the shafts 5 and 7 with their respective pulleys 9 and 12. It is thus apparent that a constant tension is maintained on the belts 11 and 14 determined by the resiliency of the spring 30. The tension of the spring 30 may be adjusted by the screw 24, as is clearly indicated in the drawing.

The feed pan 31 for the grinder is mounted to the grinder housing 32 by means of lugs 33 bolted to the grinder housing by means of nuts 34, as indicated in Figure 3. This lug 33 has a slanting indentation 35 cut therein. The pan 31 has apertures 36 within which the lugs 33 slide when the pan 31 is in position. Thumb screws 37 are positioned in the pan 31 so that their ends project within the apertures 36 and contact the slanting portion 35 of the lug 33 when the pan 31 is in position. It is thus apparent that by tightening the thumb screws 37 the action of the end of these screws on the slanting portion 35 will tend to draw the pan downwardly and against the grinder housing 32.

In my preferred embodiment I have placed louvers 38 within the housing 1 and fan blades 39 on the pulley 10, so that the fan blades 39 will draw air into the housing 1 through the louvers 38.

I do not intend to limit myself to any specific form of grinder, since it is apparent that any form may be used, and for that reason I have not described the grinder itself further.

By my construction I provide a grinder of neat and compact appearance and obtain a speed reduction by the use of belts and pulleys in an extremely compact manner, with the greater portion of the speed reducing means within the base of the grinder.

The belts may be readily removed upon wear and replaced with new belts without any great amount of difficulty and the tension readjusted by changing the tension on the spring which urges the floating shaft arbor away from the motor and grinder shaft, respectively.

In constructing my novel device it may, of course, be shaped in numerous different pleasing configurations without departing from the teachings of my invention.

It is to be understood that numerous different forms of my preferred form may be made without departing from the spirit of my invention.

Having thus described my invention, what I claim as new and desire to secure by Letters Patent, is:

1. In combination with a power grinder having a housing with a base and a motor having a shaft and a grinder having a shaft mounted in said housing with said shafts in a line, a third shaft journaled in bearings in an arbor having two legs projecting therefrom and terminated with bosses, lined projections within the base of said housing, a rod within the boss apertures of said legs and positioned against said projections, a third leg projecting from said arbor and terminating in a threaded lug, a screw in said threaded lug having a spring base on the end thereof, a boss projecting from the inside of said housing base and having a cup, a spring base rotatably positioned within said cup, and a spring positioned between said spring bases, pulleys on said shafts and belts connecting said pulleys on said motor shaft and grinder shaft with the pulleys on said third shaft, and said spring being so adjusted that a given equal tension will be maintained on said belts at all times.

2. A power grinder comprising a housing having a body portion, a base portion, a motor and a grinder mounted in said body portion, on opposite sides thereof and in substantial alignment with each other, a floating shaft mounted in said base portion and resiliently urged away from said motor and said grinder and an operative connection between said motor, said grinder and said floating shaft comprising a series of belts and pulleys.

3. In a power grinder including a motor having a shaft and a pulley mounted thereon and a grinder having a shaft and a pulley mounted thereon, a speed reduction mechanism comprising a shaft journaled in an arbor having two legs projecting therefrom in one direction and a third leg projecting therefrom in substantially the opposite direction, said two legs supported on a base and said third leg supported on a base and resiliently urged away from said shafts, said shaft in said arbor having a pulley mounted thereon in alignment with and belted to the pulley on said motor shaft and a second pulley mounted thereon in alignment with and belted to the pulley on said grinder shaft.

4. A speed reducing mechanism comprising a driving pulley and a driven pulley in axial alignment, an idling shaft carrying at least two pulleys in operative alignment with said driving and said driven pulleys and mounted in an arbor, means for resiliently urging said arbor and said shaft away from said driving and driven pulleys, said driving and driven pulleys being belted to said pulleys on said idling shaft.

5. A speed reducing mechanism comprising a driving pulley and a driven pulley in axial alignment, an idling shaft carrying at least two pulleys in operative alignment with said driving and said driven pulleys, said idling shaft being journaled between the pulleys in an arbor, means for resiliently urging said arbor and said shaft away from said driving and driven pulleys, said driving and driven pulleys being belted to said pulleys on said idling shaft.

BJARNE A. WESCHE.